INVENTOR.
EDWARD J. HAZEN

Dec. 20, 1955

E. J. HAZEN 2,727,357

JET ENGINE FUEL CONTROL WITH STALL COMPUTER

Filed April 26, 1950

INVENTOR.
EDWARD J. HAZEN
BY
Herbert L. Davis Jr.
ATTORNEY

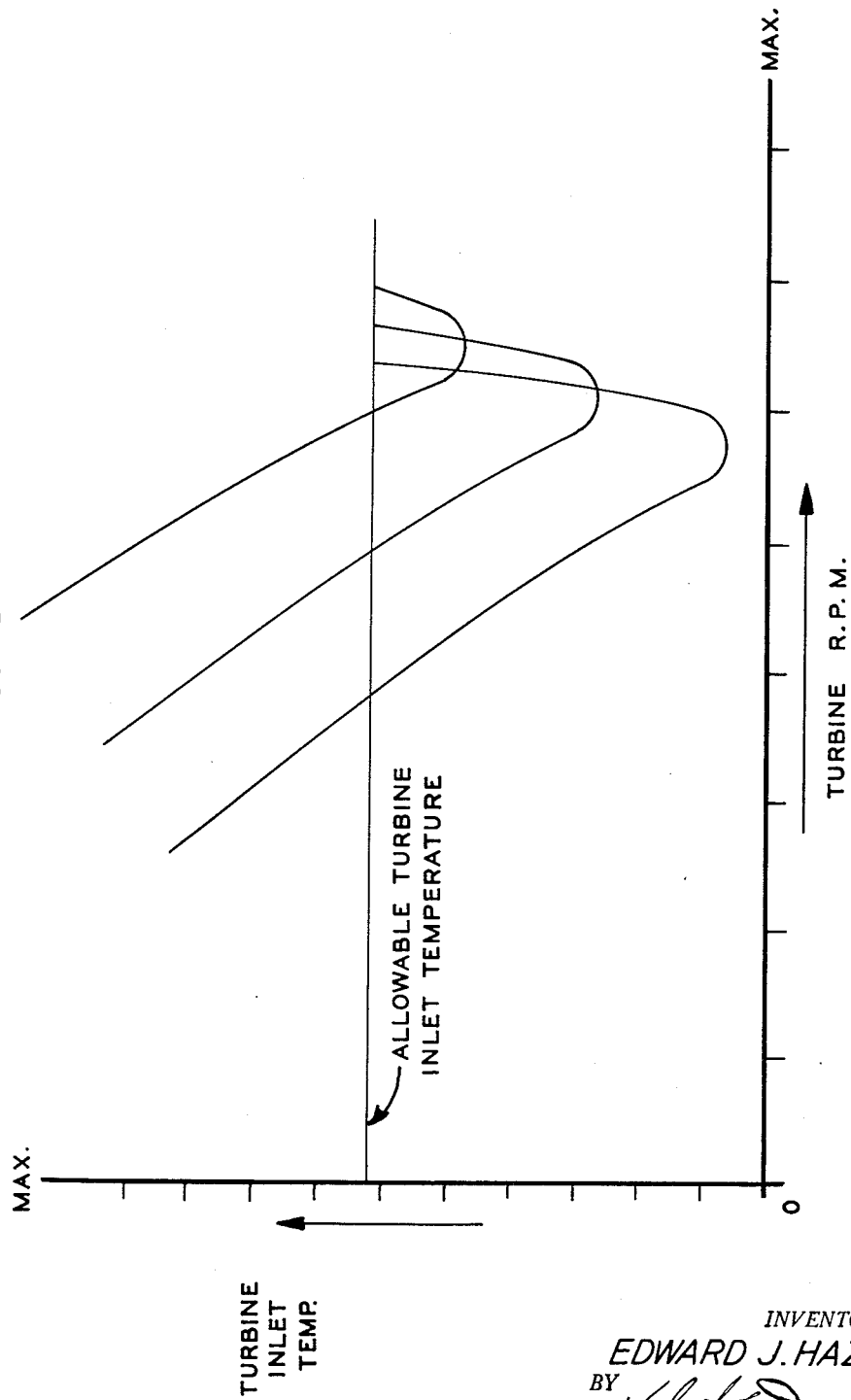

United States Patent Office 2,727,357
Patented Dec. 20, 1955

2,727,357

JET ENGINE FUEL CONTROL WITH STALL COMPUTER

Edward J. Hazen, Woodcliff Lake, N. J., assignor to Bendix Aviation Corporation, Teterboro, N. J., a corporation of Delaware Application April 26, 1950, Serial No. 158,230

7 Claims. (Cl. 60—39.28)

The present application relates to improvements in a stall computer for an electronic control system for a turbine driven aircraft engine such as disclosed and claimed in the copending application Serial No. 156,260, filed April 17, 1950, by William E. Brandau.

An object of the invention is to provide a stall computer and reset which briefly are to determine the maximum permissible combustion temperature which may be maintained without compressor surge as a function of ram air temperature and turbine speed together with novel improved means to compare this temperature and (a) reduce the selected temperature accordingly, if it is too high, or b) make no change if the selected operation is in a safe region.

It has been found that for a given compressor air inlet temperature a stall speed-ceiling curve may be plotted based on the characteristics of a particular engine to be controlled, but that such curve shifts with change in compressor air inlet temperature not only parallel to the temperature axis, but also parallel to the speed axis and therefore an object of the present invention is to provide a novel stall computer mechanism arranged to effect a stall ceiling limiting signal voltage to decrease the selected temperature to a safe value in the event a temperature should be selected within the stall region.

Under the invention, in order to avoid the stall region of the compressor which in a given engine varies as heretofore noted with inlet temperature and compressor speed, there has been devised a novel improved stall computer means including a compressor air inlet temperature sensing device and a compressor speed sensing device together with a cam and cam follower to adjustably position a variable coupling transformer of a computer in which the effective profile of the cam gives the general shape of the speed ceiling curve for the particular engine to be controlled and is so arranged that adjustment of the cam by the speed sensing device is corrected by the compressor air inlet temperature sensing device so as to result in a temperature corrected adjustment of the transformer of the computer, the output of which transformer is in turn also corrected by the air inlet temperature sensing device so that the speed ceiling curve is shifted parallel to the temperature axis and also parallel to the speed axis upon change in the prevailing air inlet temperature to provide a signal indicative of the stall ceiling based on the characteristics of the particular engine to be controlled under the given prevailing air inlet temperature and compressor speed conditions.

Another object of the invention is to provide a novel stall computer including a speed sensitive device and a variable coupling transformer positioned by the speed sensitive device and coupled to a reset transformer positioned by a motor controlled by the first transformer so as to act as a servo operated follower of speed and in which the motor positions a cam having the general shape of the speed-stall ceiling curve so as to, in turn, adjust a variable coupling transformer of a computer with change in compressor speed and in which both the computer transformer and reset transformer are corrected by a voltage from a compressor air inlet temperature sensitive transformer so as to shift the speed stall ceiling curve parallel to both the speed and temperature axis upon change in compressor air inlet temperature to thereby provide a resultant stall ceiling signal to decrease the selected temperature in the event it exceeds such ceiling to a safe value more nearly approaching the actual stall ceiling of the engine.

The above and other objects and features of the invention will appear more fully hereinafter from a consideration of the following description taken in connection with the accompanying drawing wherein one embodiment of the invention is illustrated by way of example.

In the drawings:

Figure 3 is a graph illustrating a family of stall ceiling curves under different compressor air inlet temperatures.

Figure 1:
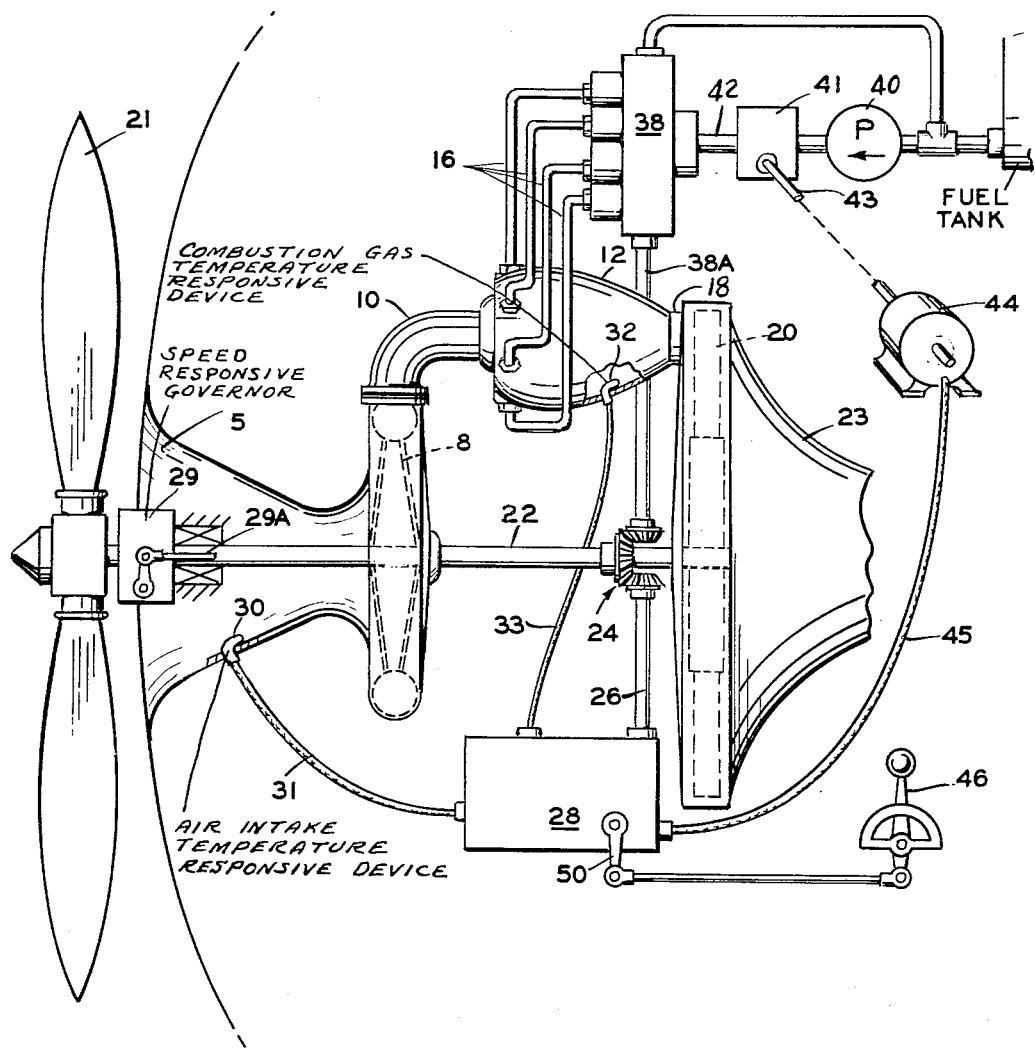
Figure 1 is a diagrammatic view of a turbine driven aircraft engine of the type with which the subject invention is designed for use.

Referring to the drawing of Figure 1, there is indicated by the numeral 2 an aircraft of a type with which the subject invention is designed for use. The aircraft in flight moves toward the left as viewed in Figure 1 so that air is rammed into an intake 5. The ram air is in turn compressed by a supercharger, blower or compressor 8 and flows through a conduit 10 into a combustion chamber 12. Fuel at a controlled rate is fed through lines 16 into the combustion chamber 12.

The products of combustion flow out through a nozzle 18 to drive a turbine 20 which drives the compressor 8 and a propeller 21 through a shaft 22. The exhaust exits through passage 23. Gearing 24 and a shaft 26 connects the shaft 22 with a flyball speed governor 27 of Figure 2 of the fuel regulator 28 hereinafter explained.

The pitch of the propeller 21 may be governed by a suitable speed responsive governor 29 of a type well known in the art and in which the speed setting may be varied under the control of the pilot by operation of control linkage 29A.

A temperature responsive device 30 sensitive to the temperature of the air at the intake 5 is operably connected through a conduit 31 to the fuel regulator for purposes hereinafter explained, while a temperature responsive device 32 is mounted at a suitable point in the combustion chamber 12 for sensing the temperature of the combustion gases. The device 32 is operably connected through a conduit 33 to the fuel regulator 28.

The fuel input lines 16 may be controlled by a suitable fuel equalizer valve 38 of a type disclosed and claimed in the copending application Serial No. 158,274 filed April 26, 1950, by Sigmund Machlanski and having maximum speed limiting means operatively connected to the shaft 22 through a shaft 38A as explained in the latter application. The equalizer valve 38 may be supplied with fuel under pressure of a pump 40 through a throttling valve 41 in a supply conduit 42.

The throttling valve 41 may be of conventional type operatively controlled through a shaft 43 by a reversible electric motor 44 connected through an electrical conduit 45 with the control system indicated generally by the numeral 28 and hereinafter explained with reference to Figure 2. Instead of a throttling valve, there may be used a variable displacement pump controlled by the motor 44 to vary the supply of fuel to the combustion chamber 12 in accordance with the demands of the regulator 28. A manually operable lever 46 may be adjusted by the pilot in flight to vary the setting of the regulator 28 to select the regulated combustion gas temperature, as hereinafter explained.

Referring to Figure 1, the regulating system is shown as including a basic temperature control circuit, the setting of which may be varied through adjustment of the manually operable lever 46 and in which a temperature signal is balanced against a selector voltage which is monitored and corrected by the operation of a novel compressor stall computer forming the subject matter of the present application. The basic temperature control circuit is claimed and described in greater detail in the aforesaid copending application Serial No. 156,260. This full floating loop, as disclosed and claimed in the latter application, may be biased by an off-speed coupling to give speed temperature interaction stability; a valve position follow-up and reset may combine to produce critical temperature damping; and an over and under speed signal device which acts both to aid the propeller pitch speed governor 29 in preventing the speed from exceeding a predetermined maximum and also to reset the combustion temperature for ground idling operation, thus permitting the scheduling of minimum combustion temperatures for air-borne approaches as set forth in the aforesaid copending application Serial No. 156,260.

Figure 2:
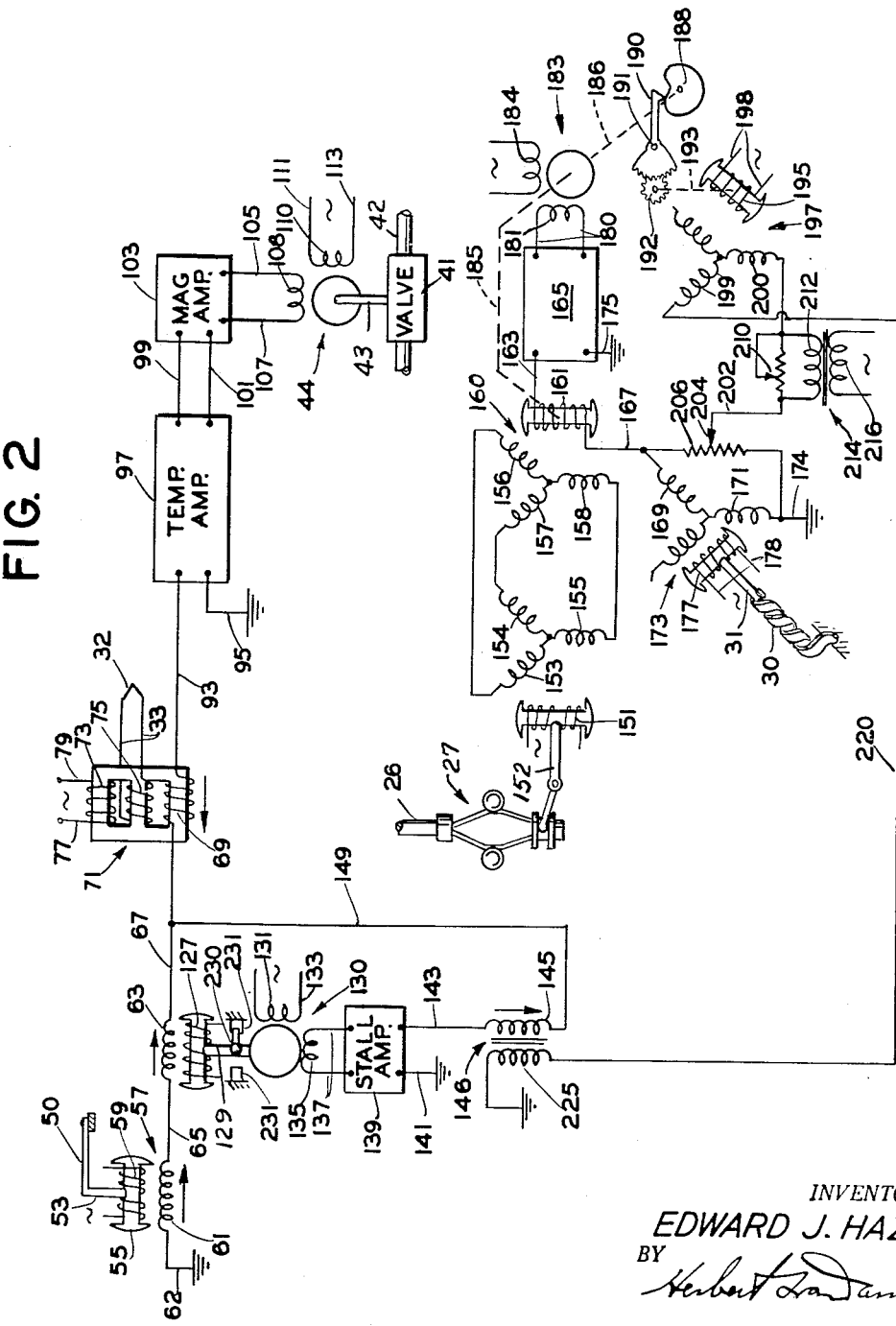
Figure 2 is a diagrammatic view illustrating a stall computer embodying the subject invention.

Referring to the drawing of Figure 2, there is indicated by the numeral 50 a temperature selector lever positioned by the manual control 46 and operably connected through a shaft 53 to a rotor 55 of an induction transformer 57. The rotor 55 has a winding 59 connected across a main source of alternating current having a constant frequency. The rotor winding 59 is inductively coupled to a stator winding 61. The coupling relation between the rotor and stator windings varies with the position of the manual control lever 46.

The winding 61 is grounded at one end by a common connection 62 and a stall computer output winding 63 is connected at the other end by a conductor 65 in series with the winding 61. The opposite end of the winding 63 is connected by a conductor 67 in series with a secondary winding 69 of a saturable core reactor 71 having a primary winding 73 and a control winding 75. The primary winding 73 is connected by conductors 77 and 79 across the main source of alternating current. Output conductors 33 lead from a temperature probe or thermo couple 32 to the control winding 75. The temperature probe 32 may be of a conventional type or of a type such as shown and described in the U. S. Patent No. 2,483,350 granted September 27, 1949, to William R. Polye and William E. Brandau and assigned to Bendix Aviation Corporation.

As shown in Figure 1, the thermo couple 32 is positioned in the combustion chamber 12 and the amplitude of the voltage induced in secondary winding 69 by winding 73 is a function inversely of the amount of D. C. current fed to the control winding 75 by the thermo couple 32 in response to the temperature of the combustion gases in the combustion chamber 12. Thus, upon an increase in the temperature of the combustion gases in the chamber 12, the D. C. voltage across the lines 33 of the saturating or control coil 75 increases causing in turn a decrease in the voltage induced in the secondary winding 69 by the primary winding 73, while a decrease in the temperature of the combustion gases in the combustion chamber effects an increase in the induced voltage in secondary winding 69.

The voltage induced in winding 69 is 180 degrees out of phase with that induced in the temperature selector winding 61 and that induced in the stall computer output winding 63 so that when out of balance a differential or signal voltage is applied through an input conductor 93 and a grounded input conductor 95 to an amplifier 97.

The amplifier 97 may be of a conventional type or may be of a type such as shown and described in U. S. Patent No. 2,493,605, granted January 3, 1950, to Adolph Warsher and assigned to Bendix Aviation Corporation.

Output conductors 99 and 101 lead from the amplifier 97 to a magnetic amplifier 103 of conventional type or of a type such as shown, for example, in the U. S. Patent No. 2,432,036, granted December 2, 1947, to Paul A. Noxon and assigned to Bendix Aviation Corporation.

Output conductors 105 and 107 lead from the magnetic amplifier 103 to a control winding 108 of the two phase motor 44. A fixed phase winding 110 of the motor 44 is connected by conductors 111 and 113 across the main source of alternating current.

The motor 44 adjusts through the shaft 43 the fuel throttling valve 41 in the fuel conduit 42 to control the fuel supplied to the combustion chamber 12.

Upon the temperature of the combustion chamber gases decreasing below that for which the temperature selector variable coupling transformer 57 is set, a signal voltage will be applied through the amplifier 97 and magnetic amplifier 103 across the motor control lines 105 and 107 of such a phase as to cause rotation of the motor 44 and adjustment of the fuel throttling valve 41 in a direction to increase the supply of fuel to the combustion chamber 12 to in turn increase the temperature of the combustion chamber gases to the selected value.

If the temperature of the combustion chamber gases increases above that for which the variable coupling transformer 57 is set, the signal voltage across lines 105 and 107 originating from the dominating differential signal voltage applied by winding 61 will have an opposite phase relation causing rotation of the motor 44 in an opposite direction to decrease the fuel supplied to the combustion chamber through the throttling valve 41 and thereby decrease the temperature of the combustion chamber gases to the selected value. It will be seen, then, that the voltage of the temperature selector transformer 57 opposes that induced in the temperature responsive winding 69 and the predominating signal voltage, of course, controls the action of the motor 44 and tends to maintain the temperature selected through the transformer 57 by the position of the pilot's control lever 46.

Stall computer

The function of the improved stall computer and reset forming the subject matter of the present application is briefly to determine the maximum permissible combustion temperature which may be maintained without compressor surge as a function of ram air temperature and turbine speed compared to the selected temperature and (a) reduce the selected temperature accordingly if it is too high or (b) make no change if the selected temperature is within a safe range.

Under the invention, in order to avoid the stall region of the compressor which varies with inlet temperature and compressor speed, there has been devised a novel inlet temperature sensing device and a compressor speed sensing device which varies the maximum permissible temperature so as to avoid stall conditions in accordance with a predetermined schedule. This schedule, of course, is dependent upon the characteristics of the particular engine to be controlled.

The stall ceiling is a function of speed and compressor inlet temperature and generally follows a given pattern as shown graphically by Figure 3.

Referring to Figure 2, there is shown the stall computer circuit in which the stall computer output winding 63 is inductively coupled to a rotor winding 127 connected across the main source of alternating current. The winding 127 is rotatably positioned relative to the output winding 63 by a shaft 129 driven by a conventional two-phase motor 130 having a fixed phase winding 131 connected by conductor 133 across the main source of alternating current and a control winding 135 connected through conductor 137 to the output of a stall amplifier 139 which may be of conventional type.

The input to the amplifier 139 includes grounded line 141 and a conductor 143 serially connected through a secondary winding 145 of transformer 146 and a conductor 149 to conductor 67 leading serially to the temperature selector winding 61 through the stall computer output winding 63.

A speed sensitive rotor winding 151 is connected across the main source of alternating current and adjustably positioned relative to the inductively coupled stator windings 153, 154 and 155 by a shaft 152 positioned by speed responsive flyball governor 27. The governor 27 is in turn connected through the shaft 26 to the turbine driven shaft 22 so that the position of the rotor winding 151 in relation to the stator windings 153, 154 and 155 and thereby the voltage induced in such windings varies in relation to the speed of the turbine 20.

The stator windings 153, 154 and 155 are operatively connected through suitable electrical conductors to stator windings 156, 157 and 158, respectively, of a second variable coupling transformer 160 having a rotor winding 161 inductively coupled to the stator winding 156, 157 and 158.

The stator windings 156, 157 and 158 are arranged so as to induce in the winding 161 a signal voltage which is a measure of the speed of the turbine 20.

One end of rotor winding 161 is connected by a conductor 163 to the input of an amplifier 165 while the opposite end of the rotor winding 161 is connected by a conductor 167 to an end of stator windings 169 and 171 of ram air intake temperature responsive variable coupling transformer 173.

The other end of the stator windings 169 and 171 are connected by a conductor 174 to ground and thereby to a grounded input conductor 175 of the amplifier 165.

Inductively coupled to the stator windings 169 and 171 is a rotor winding 177 connected by conductors 178 across the main source of alternating current.

The position of the rotor winding 177 is controlled through a flexible shaft 31 by a ram air inlet temperature sensitive device 30 which is shown in Figure 2 as of a bimetallic type for varying the position of the rotor 177 so that there is induced in the stator windings 169 and 171 a signal voltage which is a measure of the ram air inlet temperature and having a phase acting in additive relation with the signal voltage induced in the winding 161 as a measure of the speed of the turbine 20.

The rotor winding 161 thus biased by the compressor air inlet temperature is connected through input conductors 163 and 175 to the amplifier 165 and through the amplifier output conductors 180 to a control winding 181 of a two-phase servomotor 183 having a fixed phase winding 184 connected across the main source of electrical energy. The amplifier 165 may be of a conventional type or may be of a type such as shown and described in U. S. Patent No. 2,493,605 granted January 3, 1950, to Adolph Warsher and assigned to Bendix Aviation Corporation.

The motor 183 is arranged to position the winding 161 sensitive to turbine or compressor speed and compressor air inlet temperature to a null position through a shaft 185. The compressor air inlet temperature biasing windings 169 and 171 act on the rotor winding 161 so as to in effect change the apparent turbine speed sensed by the winding 161 with change in the compressor air inlet temperature.

The servomotor 183 further positions through suitable gearing and a shaft 186, a cam 188 which is cut to a profile representing the stall ceiling as a function of speed for the particular engine to be controlled.

A cam follower 190 pivoted at 191 positions through a gear 192 and shaft 193 a rotor winding 195 of a computer transformer 197. The winding 195 is connected by conductors 198 across the main source of alternating current and is inductively coupled to stator windings 199 and 200 of the transformer 197.

One end of the stator windings 199—200 is connected by a conductor 202 to an arm 204 of a potentiometer 206 connected across the lines 167 and 174 so as to apply a portion of the signal voltage induced in the windings 169 and 171 as a measure of the compressor air inlet temperature to the signal voltage induced in the computer transformer 197.

There is also provided in the line 202 a resistor 210 connected across secondary winding 212 of a transformer 214 having a primary winding 216 connected to the main source of alternating current so as to apply an A. C. voltage bias to permit operation of the variable coupling transformers 173 and 197 in the linear output region. The stator windings 169 and 171 of the variable coupling transformer 173 and the stator windings 199 and 200 of the variable coupling transformer 197 are connected in additive relation and through grounded conductor 174 and a conductor 220 across a primary winding 225 of the transformer 146 which is inductively coupled to the secondary winding 145.

The voltage induced in the stall computer output winding 145 will act in opposition to the voltage induced in the temperature selector winding 61.

The voltage induced in the winding 145 will be a function of the turbine speed and ram air inlet temperature as well as the particular characteristics of the engine to be controlled upon which the profile of the cam 188 is based.

In the event the voltage induced in the winding 145 exceeds the voltage induced in the temperature selector winding 61 indicating selection of a temperature within the stall range, the differential signal voltage applied to the stall computer amplifier 139 will then cause the actuator motor 130 to crank the rotor winding 127 so as to induce an additional voltage in the winding 63 as may be required to maintain a zero voltage around the reset loop and thus reduce the selected temperature to the level dictated by the stall computer. The reverse action of increasing the selected temperature to the stall level is prevented by incorporating a zero stop 230 and 231 on the shaft 129 to prevent rotation of the rotor winding 127 in a direction such as to increase the selected temperature. If, however, the selected temperature should exceed the stall ceiling, the winding 127 is free to rotate so as to subtract from the selected temperaure until the equation-selected temperature plus correction equals temperature ceiling is satisfied.

It will be seen from the foregoing that the cam 188 gives the general shape of the speed ceiling curve and that the compressor air inlet temperature responsive transformer 173 by applying the bias voltage to the speed follower rotor winding 161 shifts this curve parallel to the speed axis for changes in such temperature (since it changes the apparent speed), and further the compressor air inlet temperature responsive transformer 173 in cooperating with the computer transformer 197 shifts the curve parallel to the temperature axis for change in such temperature, as shown by Figure 3 showing a series of such curves under different air inlet temperature conditions.

Although only one embodiment of the invention has been illustrated and described, various changes in the form and relative arrangements of the parts may be made to suit requirements.

What is claimed is:

1. For use with an aircraft engine having a combustion chamber, an air intake conduit to said chamber, a fuel intake conduit to said chamber, a turbine driven by the combustion gases from said chamber, a compressor driven by said turbine to supply air to the air intake conduit, a device to regulate the supply of fuel to said combustion chamber to maintain a predetermined combustion gas temperature, and operator-operative means to select said combustion gas temperature; a stall computer to determine the maximum permissible combustion gas temperature without compressor surge, comprising, in combination, compressor speed responsive means, compressor air intake temperature responsive means, motor means controlled by said speed and temperature responsive means, cam means adjustably positioned by said motor means, said cam means having an effective profile to decrease the selected combustion gas temperature to a maximum permissible combustion gas temperature in accordance with predetermined characteristics of the engine for avoiding surging by the compressor, means controlled by said cam means, said last mentioned means and said air intake temperature responsive means cooperating to decrease the selected temperature to a value permissible for avoiding surging of the compressor under the compressor speed and air intake temperature conditions then prevailing.

2. The combination defined by claim 1 including a first variable induction transformer operated by the compressor speed responsive means, a second variable induction transformer operated by the compressor air intake temperature responsive means, said first transformer to apply a temperature signal to said second transformer, said second transformer to apply a speed signal corrected by said temperature signal to control said motor means, a third variable induction transformer operated by said motor means, a fourth variable induction transformer to decrease the temperature selected by the operator-operative means, a second motor means to operate said fourth transformer, said second and third transformers cooperating to control said second motor means so as to decrease the selected temperature to a value less than that of the stall region of said compressor as determined by the speed of said compressor, the compressor air intake temperature and the effective profile of said cam means.

3. For use in controlling fuel supply to a supercharged aircraft engine, the combination comprising supercharger speed responsive means, air intake temperature responsive means, motor means controlled by said first and second means, a cam driven by said motor means, a follower for said cam, said cam having an effective profile made in accordance with predetermined characteristics of the engine effecting surging at the supercharger, and means operated by said follower and said air intake temperature responsive means for controlling the fuel supply to said engine.

4. In an aircraft engine including a combustion chamber, an air intake conduit to said chamber, a fuel intake conduit to said chamber, a turbine driven by the combustion gases from said chamber, a compressor driven by said turbine to supply air to the air intake conduit, a device to control the supply of fuel to the combustion chamber of said engine, operator-operative means for said control device, and a stall computer including compressor speed responsive means and compressor air intake temperature responsive means for varying the supply of fuel to the combustion chamber so as to maintain the fuel supply within limits to avoid surging of the compressor; the improvement comprising a cam, a motor to drive said cam, said motor controlled by said speed and temperature responsive means, said cam having an effective surface made in accordance with predetermined operating characteristics of the engine to avoid surging of the compressor, a cam follower cooperating with said cam surface, and means positioned by said cam follower and affected by said air intake temperature responsive means for decreasing the supply of fuel to within limits avoiding surging of the compressor in accordance with the operating characteristics of the controlled engine.

5. The combination comprising a cam, a cam follower, said cam having a contour cooperating with said cam follower and effective to adjust said cam follower in accordance with predetermined characteristics of an aircraft engine to be controlled, engine speed responsive means, engine air intake temperature responsive means, motor means controlled by said speed and temperature responsive means for positioning said cam so as to cause adjustment of the cam follower in accordance with the effective contour of the cam, control means operated by said cam follower, and other means operatively connecting the temperature responsive means to the control means to vary the effect thereof with changes in the air intake temperature.

6. The combination defined by claim 5 in which the control means includes a variable induction transformer, means operatively connecting the cam follower to said transformer, and other means operatively connecting the temperature responsive means to said transformer for varying the effect of said transformer with changes in the air intake temperature.

7. The combination comprising a cam having an effective contour made in accordance with predetermined characteristics of an aircraft engine to be controlled, a cam follower cooperating with said effective contour, engine speed responsive means, engine air intake temperature responsive means, a motor controlled by at least one of said means for positioning said cam, electrical control means operated by said cam follower, and means operated by said engine air intake temperature responsive means for applying a signal voltage to said control means varying with changes in the prevailing air intake temperature.

References Cited in the file of this patent

UNITED STATES PATENTS

| | | |
|---|---|---|
| 2,432,177 | Sedille | Dec. 9, 1947 |
| 2,479,813 | Chamberlin et al. | Aug. 23, 1949 |
| 2,557,562 | Bobier | June 19, 1951 |